(12) United States Patent
Harayama

(10) Patent No.: US 10,239,310 B2
(45) Date of Patent: Mar. 26, 2019

(54) NON-TRANSITORY COMPUTER READABLE MEDIUM STORED WITH PREDICTED VALUE OUTPUT PROGRAM, PREDICTED VALUE OUTPUT DEVICE, AND PREDICTED VALUE OUTPUT METHOD

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/824,211

(22) Filed: Nov. 28, 2017

(65) Prior Publication Data

US 2018/0147838 A1    May 31, 2018

(30) Foreign Application Priority Data

Nov. 30, 2016   (JP) ................................ 2016-232656

(51) Int. Cl.
| | |
|---|---|
| *B41J 2/045* | (2006.01) |
| *B33Y 50/00* | (2015.01) |
| *B29C 64/112* | (2017.01) |
| *B29C 64/386* | (2017.01) |
| *B33Y 50/02* | (2015.01) |
| *B29C 64/393* | (2017.01) |

(52) U.S. Cl.
CPC ......... *B41J 2/04536* (2013.01); *B29C 64/112* (2017.08); *B29C 64/386* (2017.08); *B29C 64/393* (2017.08); *B33Y 50/00* (2014.12); *B33Y 50/02* (2014.12); *B41J 2/04586* (2013.01)

(58) Field of Classification Search
CPC .. B41J 2/04536; B41J 2/04586; B41J 29/393; B41J 29/38; B29C 64/112; B29C 64/386; B33Y 50/00; B33Y 50/02
USPC .................................................. 347/5, 7, 19
See application file for complete search history.

(56) References Cited

U.S. PATENT DOCUMENTS

| | | | |
|---|---|---|---|
| 6,754,455 B2* | 6/2004 | Kawase ............. | G03G 15/0856 358/1.16 |
| 7,493,056 B2* | 2/2009 | Katou .................... | G03G 15/55 358/1.15 |
| 7,532,833 B2* | 5/2009 | Inoue ................... | B41J 2/17566 347/19 |
| 8,251,482 B1* | 8/2012 | Yasutani ................ | B41J 29/393 347/10 |
| 8,666,267 B2* | 3/2014 | Nagai ................ | G03G 15/5025 399/27 |

* cited by examiner

*Primary Examiner* — An H Do
(74) *Attorney, Agent, or Firm* — Rankin, Hill & Clark LLP

(57) ABSTRACT

A non-transitory computer readable medium stored with a predicted value output program, a predicted value output device, and a predicted value output method that can improve an accuracy of a predicted value of a value related to printing by an ink jet printer are provided. A printer controller configured to acquire and output a predicted value of a print-related value as a value related to printing by a 3D printer from 3D model data used in the printing by the 3D printer according to a print-related value prediction rule acquires an actual value of the print-related value in the printing by the 3D printer using the 3D model data (S231), and corrects the print-related value prediction rule based on a corresponding relationship of the 3D model data and the actual value acquired in S231 (S232).

10 Claims, 11 Drawing Sheets

NON-TRANSITORY COMPUTER READABLE MEDIUM STORED WITH PREDICTED VALUE OUTPUT PROGRAM, PREDICTED VALUE OUTPUT DEVICE, AND PREDICTED VALUE OUTPUT METHOD

CROSS REFERENCE TO RELATED APPLICATIONS

This application claims the priority benefit of Japanese Patent Application No. 2016-232656, filed on Nov. 30, 2016. The entirety of the above-mentioned patent application is hereby incorporated by reference herein and made a part of this specification.

TECHNICAL FIELD

The present disclosure relates to a non-transitory computer readable medium stored with a predicted value output program, a predicted value output device, and a predicted value output method for outputting a predicted value of a value related to printing performed by an ink jet printer.

DESCRIPTION OF THE BACKGROUND ART

Conventionally, a technique is known that predicts an ink amount and time required for printing performed by an ink jet printer from data used in the printing by the ink jet printer, and that displays predicted ink amount and time (for example, see Japanese Unexamined Patent Publication No. 2004-188713 A).

SUMMARY

However, in the conventional technique, there is a problem that a large difference may be present between predicted ink amount and time and ink amount and time that were required by actually performing printing by an ink jet printer.

Thus, the present disclosure aims to provide a non-transitory computer readable medium stored with a predicted value output program, a predicted value output device, and a predicted value output method that can improve accuracy of a predicted value for a value related to printing by an ink jet printer.

A non-transitory computer readable medium stored with a predicted value output program according to one aspect of this disclosure includes instructions for causing a computer to realize: a predicted value acquiring section configured to acquire a predicted value for a print-related value, which is a value related to printing by an ink jet printer, from data used in the printing by the ink jet printer according to a specific rule; a predicted value outputting section configured to output the predicted value acquired by the predicted value acquiring section; an actual value acquiring section configured to acquire an actual value of the print-related value in the printing by the ink jet printer based on the data and a rule correcting section configured to correct the specific rule, wherein the rule correcting section corrects the specific rule based on a corresponding relationship of the data and the actual value acquired by the actual value acquiring section for the data.

According to this configuration, the computer executing the predicted value output program of the present disclosure corrects the specific rule using the data used in the printing by the ink jet printer, the specific rule being for acquiring the predicted value of the print-related value, which is the value related to the printing by the ink jet printer, based on the corresponding relationship of the data used in the printing by the ink jet printer and the actual value of the print-related value in the printing by the ink jet printer based on this data, and as such, an accuracy of the predicted value for the value related to the printing by the ink jet printer can be improved.

In the non-transitory computer readable medium according to the one aspect, in the predicted value output program, the rule correcting section may correct the specific rule based on a plurality of the corresponding relationships, which respectively correspond to plural sets of printing ranges in one print job performed by the ink jet printer based on the data.

According to this configuration, the computer executing the predicted value output program of the present disclosure corrects the specific rule using the data used in the printing by the ink jet printer, the specific rule being for acquiring the predicted value of the print-related value, which is the value related to the printing by the ink jet printer, based on the plurality of corresponding relationships that are to be acquired in the one print job by the ink jet printer based on the data, and as such, the accuracy of the predicted value for the value related to the printing by the ink jet printer can further be improved.

In the non-transitory computer readable medium according to the one aspect, in the predicted value output program, the print-related value may be an ink amount required for the printing by the ink jet printer.

According to this configuration, the computer executing the predicted value output program of the present disclosure can improve an accuracy of the predicted value of the ink amount required for the printing by the ink jet printer, and convenience can thereby be improved.

In the non-transitory computer readable medium according to the one aspect, in the predicted value output program, the print-related value may be time required for the printing by the ink jet printer.

According to this configuration, the computer executing the predicted value output program of the present disclosure can improve an accuracy of the predicted value of the time required for the printing by the ink jet printer, and convenience can thereby be improved.

In the non-transitory computer readable medium according to the one aspect, in the predicted value output program, the print-related value may be cost required for the printing by the ink jet printer.

According to this configuration, the computer executing the predicted value output program of the present disclosure can improve an accuracy of the predicted value of the cost required for the printing by the ink jet printer, and convenience can thereby be improved.

A predicted value output device of the present disclosure includes: a predicted value acquiring section configured to acquire a predicted value for a print-related value, which is a value related to printing by an ink jet printer, from data used in the printing by the ink jet printer according to a specific rule; a predicted value outputting section configured to output the predicted value acquired by the predicted value acquiring section; an actual value acquiring section configured to acquire an actual value of the print-related value in the printing by the ink jet printer based on the data; and a rule correcting section configured to correct the specific rule, wherein the rule correcting section corrects the specific rule based on a corresponding relationship of the data and the actual value acquired by the actual value acquiring section for the data.

According to this configuration, the predicted value output device of the present disclosure corrects the specific rule using the data used in the printing by the ink jet printer, the specific rule being for acquiring the predicted value of the print-related value, which is the value related to the printing by the ink jet printer, based on the corresponding relationship of the data used in the printing by the ink jet printer and the actual value of the print-related value in the printing by the ink jet printer based on this data, and as such, the accuracy of the predicted value for the value related to the printing by the ink jet printer can be improved.

A predicted value output method of the present disclosure includes: a predicted value acquiring step of acquiring a predicted value for a print-related value, which is a value related to printing by an ink jet printer, from data used in the printing by the ink jet printer according to a specific rule; a predicted value outputting step of outputting the predicted value acquired in the predicted value acquiring step; an actual value acquiring step of acquiring an actual value of the print-related value in the printing by the ink jet printer based on the data; and a rule correcting step of correcting the specific rule, wherein the rule correcting step corrects the specific rule based on a corresponding relationship of the data and the actual value acquired in the actual value acquiring step for the data.

According to this configuration, the predicted value output method of the present disclosure corrects the specific rule using the data used in the printing by the ink jet printer, the specific rule being for acquiring the predicted value of the print-related value, which is the value related to the printing by the ink jet printer, based on the corresponding relationship of the data used in the printing by the ink jet printer and the actual value of the print-related value in the printing by the ink jet printer based on this data, and as such, the accuracy of the predicted value for the value related to the printing by the ink jet printer can be improved.

The non-transitory computer readable medium stored with the predicted value output program, the predicted value output device, and the predicted value output method of the present disclosure can improve the accuracy of the predicted value of the value related to the printing by the ink jet printer.

DETAILED DESCRIPTION OF EMBODIMENTS

Hereinbelow, an embodiment of the present disclosure will be described with reference to the drawings.

Firstly, a configuration of a three-dimensional shaping system according to the present embodiment will be described.

Figure 1:
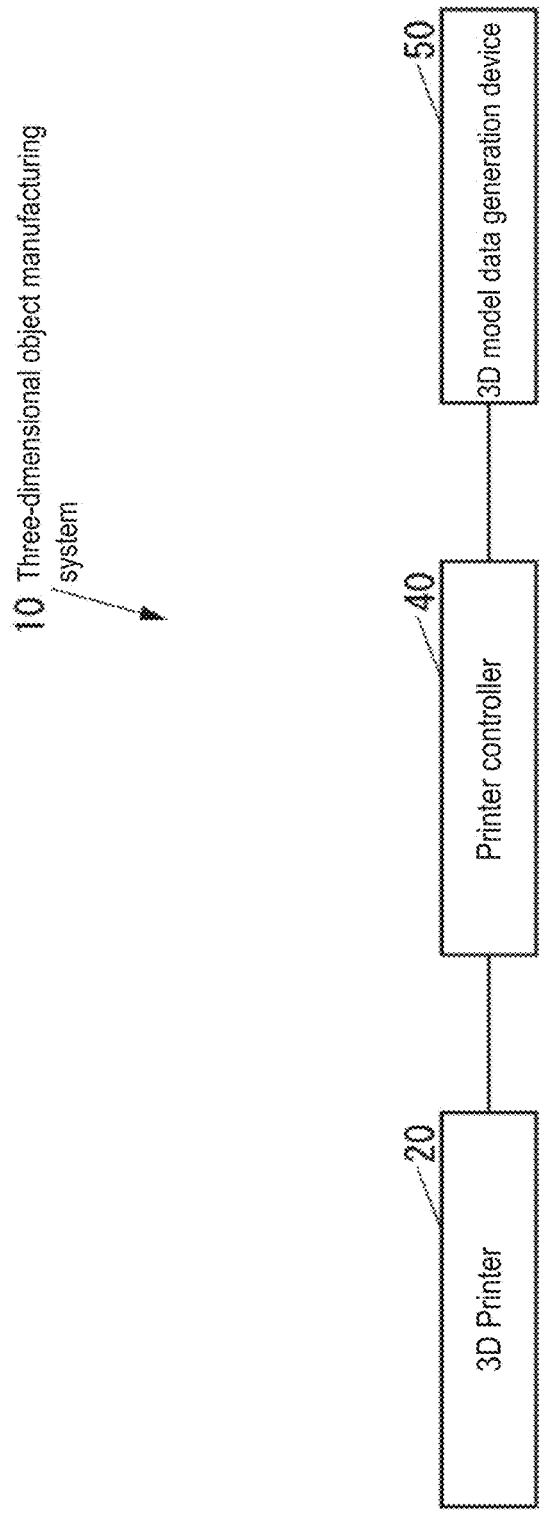
FIG. 1 is a block diagram of a three-dimensional shaping system of an embodiment of the present disclosure.

FIG. 1 is a block diagram of a three-dimensional shaping system 10 according to the present embodiment.

As shown in FIG. 1, the three-dimensional shaping system 10 is provided with a 3D printer 20 being an ink jet printer for shaping a three-dimensional object using ink printing, a printer controller 40 configured to control the 3D printer 20, and a 3D model data generation device 50 configured to generate 3D model data in formats such as an OBJ format, 3Mf format, STL format, for example. The printer controller 40 is a device that generates shaping data executable by the 3D printer 20 based on the 3D model data.

Figure 2:
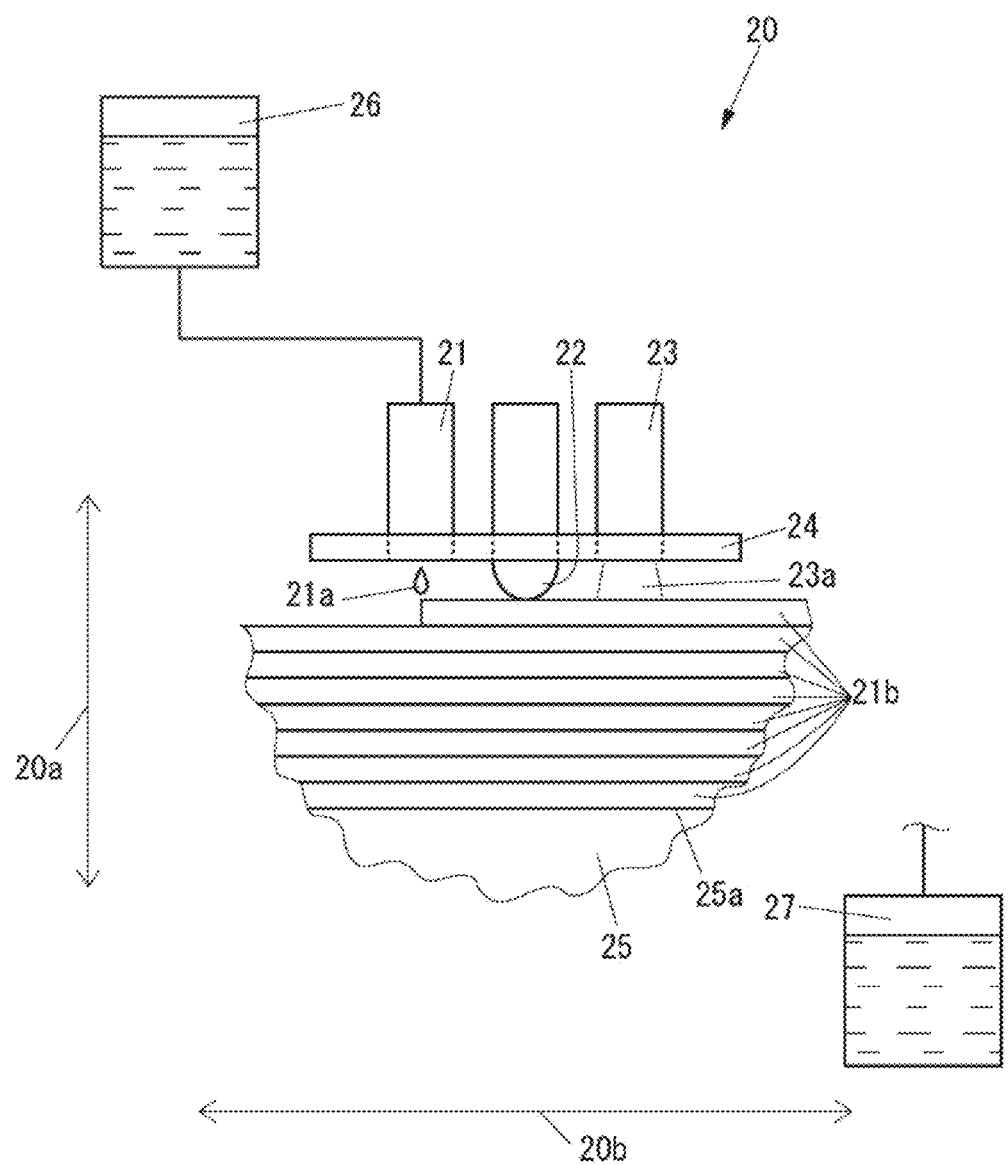
FIG. 2 is a front view diagram of a 3D printer shown in FIG. 1.

FIG. 2 is a front view diagram of the 3D printer 20.

As shown in FIG. 2, the 3D printer 20 includes a carriage 24 installed with a plurality of ink jet heads 21 for ejecting ultraviolet curableink (hereafter termed "UV ink") 21a downward along a vertical direction 20a, a flattening roller 22, being a flattening member for contacting and flattening a layer 21b of the UV ink 21a ejected and formed by the ink jet heads 21, and an ultraviolet light irradiator 23 for irradiating ultraviolet light 23a to the layer 21b of the UV ink 21a.

It should be noted that in FIG. 2, only one ink jet head 21 is depicted. However, in reality, the 3D printer 20 is provided with the ink jet heads 21 for respective types of the UV ink 21a.

As the UV ink 21a, for example, there exist shaping ink, which is to be a material of the three-dimensional object, and support ink, which is to be a material of a supporting portion that supports the three-dimensional object for forming the three-dimensional object of a desired shape.

As the shaping ink, for example, there exist white modeling ink, which is to be a material of a base portion of the three-dimensional object, color ink, which is for decorating a surface portion of the three-dimensional object by being arranged on an outer side of the modeling ink of the three-dimensional object, and clear ink for decorating the surface portion of the three-dimensional object by being arranged on an outer side of the modeling ink or the color ink of the three-dimensional object. As the color ink, for example, there exist cyan ink, magenta ink, yellow ink, and black ink.

The support ink is ink that can easily be removed by specific types of liquid, such as water for example. In the 3D printer 20, the supporting portion is formed at a lower side along the vertical direction 20a and along a horizontal direction with respect to the three-dimensional object. For example, in a case where the three-dimensional object is provided with an over-hanging portion, the supporting portion is formed on a lower side of the over-hanging portion along the vertical direction 20a to support the over-hanging portion.

The 3D printer 20 is provided with a stage 25 having a support surface 25a that is for supporting the three-dimensional object and the supporting portion, which are formed of the UV ink 21a, ejected by the ink jet heads 21 and cured by the ultraviolet light 23a from the ultraviolet light irradiator 23. The support surface 25a extends in the horizontal direction intersecting the vertical direction 20a perpendicularly.

One of the carriage 24 and the stage 25 is capable of relative movement with respect to the other thereof.

For example, the carriage 24 is capable of relative movement with respect to the stage 25 in a main scanning direction 20b by being movably supported by a mechanism that is not shown along the main scanning direction 20b within the horizontal direction. It should be noted that hereinbelow, an example will be given in which the carriage 24 moves relatively in the main scanning direction 20b with respect to the stage 25 by moving in the main scanning direction 20b, however, the stage 25 may move relatively in the main scanning direction 20b with respect to the carriage 24 by moving in the main scanning direction 20b, or one of the carriage 24 and the stage 25 may move relatively with respect to the other thereof in the main scanning direction 20b by allowing both of the carriage 24 and the stage 25 to move in the main scanning direction 20b.

Further, the carriage 24 is capable of relative movement in a sub scanning direction with respect to the stage 25 by being movably supported by a mechanism that is not shown along the sub scanning direction, which intersects the main scanning direction 20b perpendicularly, within the horizontal direction. It should be noted that hereinbelow, an example will be given in which the carriage 24 moves relatively in the sub scanning direction with respect to the stage 25 by moving in the sub scanning direction, however, the stage 25 may move relatively in the sub scanning direction with respect to the carriage 24 by moving in the sub scanning direction, and one of the carriage 24 and the stage 25 may move relatively with respect to the other thereof in the sub scanning direction by allowing both of the carriage 24 and the stage 25 to move in the sub scanning direction.

One of the carriage 24 and the stage 25 is capable of relative movement with respect to the other thereof in the vertical direction 20a. For example, the stage 25 can move relatively in the vertical direction 20a with respect to the carriage 24 by being movably supported by a mechanism that is not shown along the vertical direction 20a. It should be noted that hereinbelow, an example will be given in which the stage 25 moves relatively in the vertical direction 20a with respect to the carriage 24 by moving in the vertical direction 20a, however, the carriage 24 may move relatively in the vertical direction 20a with respect to the stage 25 by moving in the vertical direction 20a, and one of the carriage 24 and the stage 25 may move relatively with respect to the other thereof in the vertical direction 20a by allowing both of the carriage 24 and the stage 25 to move in the vertical direction 20a.

The 3D printer 20 includes an ink tank 26 storing the UV ink 21a to be supplied to the ink jet heads 21, and a discarded ink tank 27 for storing the UV ink 21a that is discarded when shaping (printing) is performed (hereafter termed "discarded ink"), such as the UV ink 21a that was scraped off from the layer 21b by the flattening roller 22 to flatten the layer 21b formed by the shaping ink and the support ink, and the UV ink 21a that was ejected by maintenance of the ink jet heads 21 or the like.

It should be noted that in FIG. 2, only one ink tank 26 is depicted. However, in actuality, the 3D printer 20 includes ink tanks 26 for respective types of the UV ink 21a.

Figure 3:
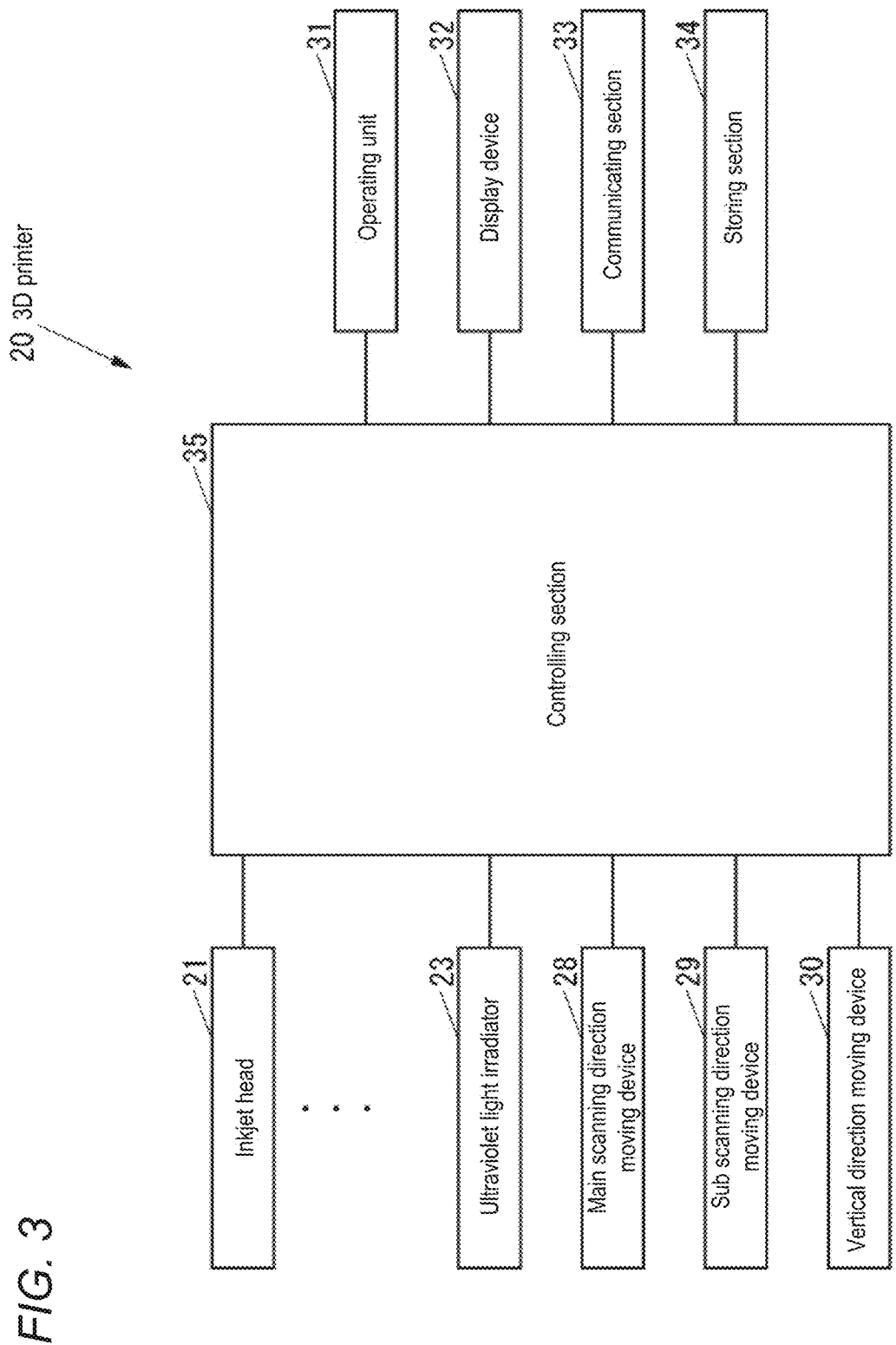
FIG. 3 is a block diagram of the 3D printer shown in FIG. 1.

FIG. 3 is a block diagram of the 3D printer 20.

As shown in FIG. 3, the 3D printer 20 includes a main scanning direction moving device 28 configured to move the carriage 24 (see FIG. 2) in the main scanning direction 20b (see FIG. 2), a sub scanning direction moving device 29 configured to move the carriage 24 in the sub scanning direction, a vertical direction moving device 30 configured to move the stage 25 (see FIG. 2) in the vertical direction 20a (see FIG. 2), an operating unit 31 being an input device such as buttons to which various operations are to be inputted, a display device 32 being a display device such as an LCD (Liquid Crystal Display) for displaying various types of information, a communicating section 33 being a communication device for communicating with an external device via a network such as a LAN (Local Area Network) or without intervening a network, using wired or wireless connections, a storing section 34 being a nonvolatile storage device such as a semiconductor memory or an HDD (Hard Disk Drive) storing various types of information, and a controlling section 35 configured to control an entirety of the 3D printer 20.

The controlling section 35 is provided with a CPU (Central Processing Unit), a ROM (Read Only Memory) that stores programs and various types of data in advance, and a RAM (Random Access Memory) used as a working area for the CPU, for example. The CPU is configured to execute the programs stored in the ROM or the storing section 34.

The controlling section 35 controls the ink jet heads 21, the ultraviolet light irradiator 23, the main scanning direction moving device 28, the sub scanning direction moving device 29, and the vertical direction moving device 30 according to shaping data inputted from the printer controller 40 (see FIG. 1) via the communicating section 33. Specifically, the controlling section 35 forms a layer 21b made of the shaping ink and the support ink and extending in the horizontal direction by using the ink jet heads 21 and the ultraviolet light irradiator 23, while moving the carriage 24 in the main scanning direction 20b by the main scanning direction moving device 28 each time when a position of the carriage 24 in the sub scanning direction with respect to the stage 25 is changed by the sub scanning direction moving device 29. Further, the controlling section 35 forms the three-dimensional object and the supporting portion on the stage 25 by stacking layers 21b made of the shaping ink and the support ink and extending in the horizontal direction atop one another in the vertical direction 20a by repeating the aforementioned operation each time a position of the stage 25 in the vertical direction 20a with respect to the carriage 24 is changed by the vertical direction moving device 30.

Figure 4:
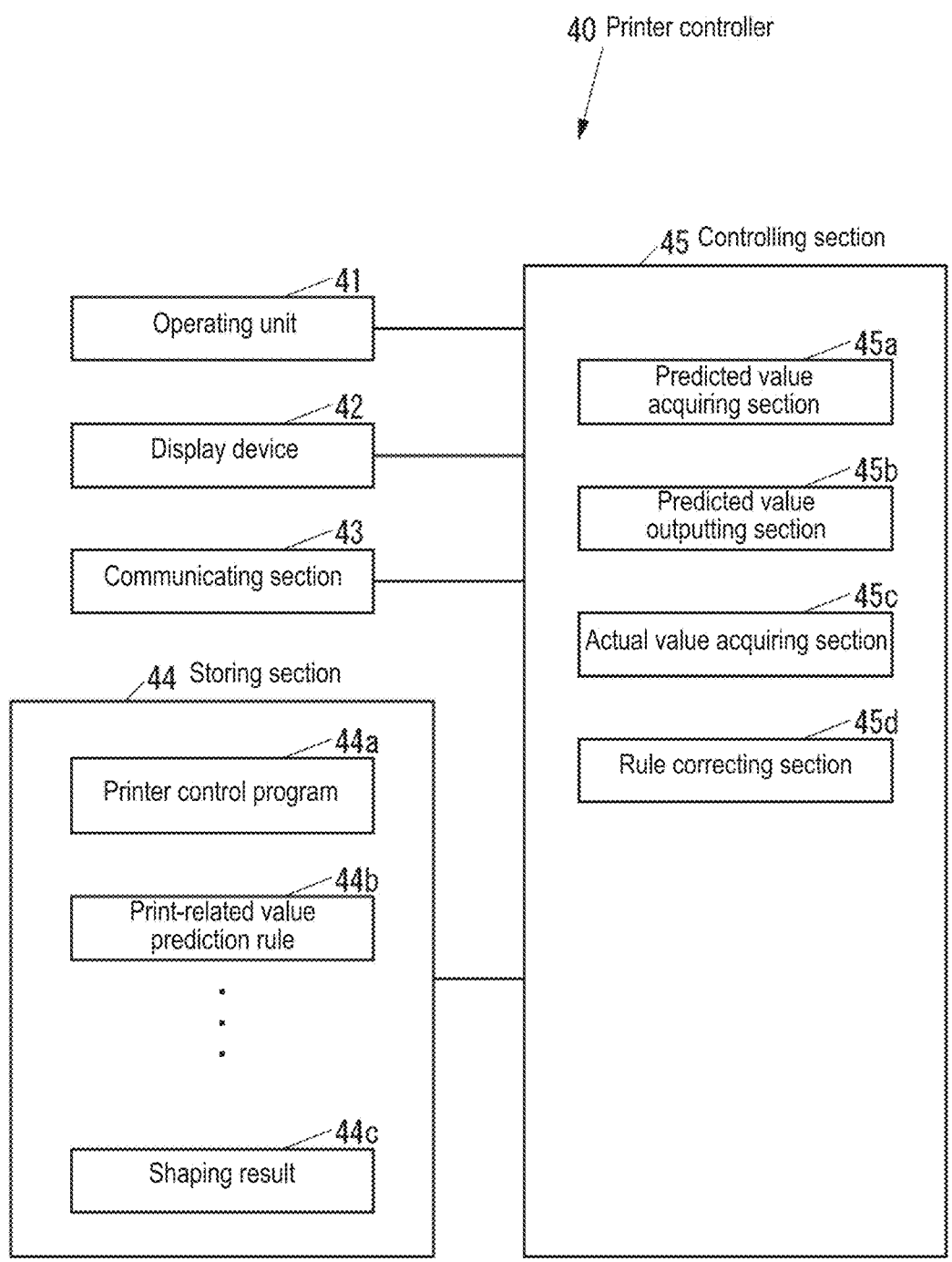
FIG. 4 is a block diagram of a printer controller shown in FIG. 1.

FIG. 4 is a block diagram of the printer controller 40.

As shown in FIG. 4, the printer controller 40 includes an operating unit 41 being an input device such as a keyboard and a mouse to which various operations are to be inputted, a display device 42 being a display device such as an LCD for displaying various types of information, a communicating section 43 being a communication device for communicating with an external device via a network such as a LAN or without intervening a network, using wired or wireless connections, a storing section 44 being a nonvolatile storage device such as a semiconductor memory or an HDD storing various types of information, and a controlling section 45 configured to control an entirety of the printer controller 40. The printer controller 40 is configured for example by a computer, such as a PC (Personal Computer).

The storing section 44 stores a printer control program 44a for controlling the 3D printer 20 (see FIG. 3). The printer control program 44a may be installed in the printer controller 40 during manufacture of the printer controller 40, may be additionally installed to the printer controller 40 from an external storage medium such as a USB (Universal Serial Bus) memory, a CD (Compact Disk), or a DVD (Digital Versatile Disk), or may be additionally installed to the printer controller 40 from a network.

The storing section 44 stores a print-related value prediction rule 44b for each type of print-related values, the print-related value prediction rule 44b being a specific rule for acquiring a predicted value of the print-related value as a value related to the printing by the 3D printer 20 from 3D model data as data used in the printing by the 3D printer 20. The print-related value prediction rule 44b is for example a calculation formula. Here, as such a print-related value, for example, a time required for the printing by the printing by the 3D printer 20, an amount of the UV ink 21a required for the printing by the 3D printer 20, an amount of discarded ink required for the printing by the 3D printer 20, and cost required for the printing by the 3D printer 20 may be exemplified.

The storing section 44 stores a shaping result 44c as a result of the printing by the 3D printer 20. The shaping result 44c includes actual values of the print-related values for each print job by the 3D printer 20.

The controlling section 45 is provided with a CPU, a ROM that stores programs and various types of data in advance, and a RAM used as a working area for the CPU, for example. The CPU is configured to execute the programs stored in the ROM or the storing section 44.

The controlling section 45 realizes a predicted value acquiring section 45a configured to acquire a predicted value of a print-related value of the 3D printer 20 from 3D model data according to the print-related value prediction rule 44b, a predicted value outputting section 45b configured to output the predicted value acquired by the predicted value acquiring section 45a to the display device 42, an actual value acquiring section 45c configured to acquire an actual value of the print-related value in the printing by the 3D printer 20 based on the 3D model data, and a rule correcting section 45d configured to correct the print-related value prediction rule 44b by executing the printer control program 44a.

It should be noted that, as aforementioned, the printer controller 40 outputs the predicted value of the print-related value of the 3D printer 20 to the display device 42 by executing the printer control program 44a, it configures a predicted value output device of the present disclosure. Further, the printer control program 44a configures a non-transitory computer readable medium stored with a predicted value output program of the present disclosure.

Figure 5:
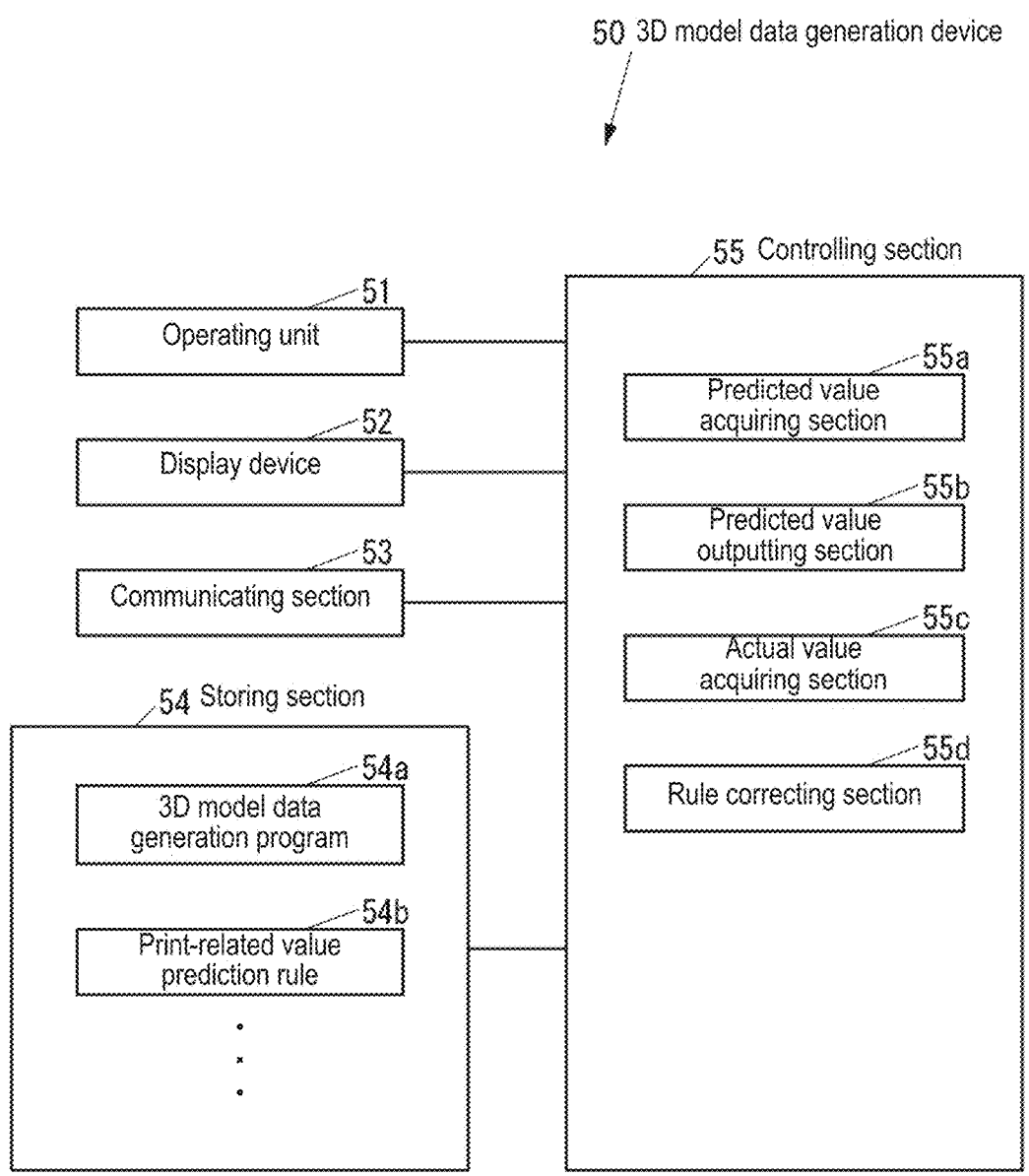
FIG. 5 is a block diagram of a 3D model data generation device shown in FIG. 1.

FIG. 5 is a block diagram of the 3D model data generation device 50.

As shown in FIG. 5, the 3D model data generation device 50 includes an operating unit 51 being an input device such as a keyboard and a mouse to which various operations are to be inputted, a display device 52 being a display device such as an LCD for displaying various types of information, a communicating section 53 being a communication device for communicating with an external device via a network such as a LAN or without intervening a network, using wired or wireless connections, a storing section 54 being a nonvolatile storage device such as a semiconductor memory or an HDD storing various types of information, and a controlling section 55 configured to control an entirety of the 3D model data generation device 50. The 3D model data generation device 50 is configured for example by a computer such as a PC.

The storing section 54 stores a 3D model data generation program 54a for generating 3D model data. The 3D model data generation program 54a may be installed in the 3D model data generation device 50 during a manufacturing process of the 3D model data generation device 50, may be installed additionally to the 3D model data generation device 50 from an external storage medium such as a USB memory, a CD, or a DVD, or may be installed additionally to the 3D model data generation device 50 from a network.

The storing section 54 stores a print-related value prediction rule 54b for each type of print-related values, the print-related value prediction rule 54b being a specific rule for acquiring a predicted value of the print-related value of the 3D printer 20 from 3D model data. The print-related value prediction rule 54b is for example a calculation formula.

The controlling section 55 is provided with a CPU, a ROM that stores programs and various types of data in advance, and a RAM used as a working area for the CPU, for example. The CPU is configured to execute the programs stored in the ROM or the storing section 54.

The controlling section 55 realizes a predicted value acquiring section 55a configured to acquire a predicted value of a print-related value of the 3D printer 20 from 3D model data according to the print-related value prediction rule 54b, a predicted value outputting section 55b configured to output the predicted value acquired by the predicted value acquiring section 55a to the display device 52, an actual value acquiring section 55c configured to acquire an actual value of the print-related value in the printing by the 3D printer 20 based on the 3D model data, and a rule correcting section 55d configured to correct the print-related value prediction rule 54b by executing the 3D model data generation program 54a.

It should be noted that, as aforementioned, the 3D model data generation device 50 outputs the predicted value of the print-related value of the 3D printer 20 to the display device 52 by executing the 3D model data generation program 54a, it configures a predicted value output device of the present disclosure. Further, the 3D model data generation program 54a configures a non-transitory computer readable medium stored with a predicted value output program of the present disclosure.

Next, an operation of the printer controller 40 will be described.

Figure 6:
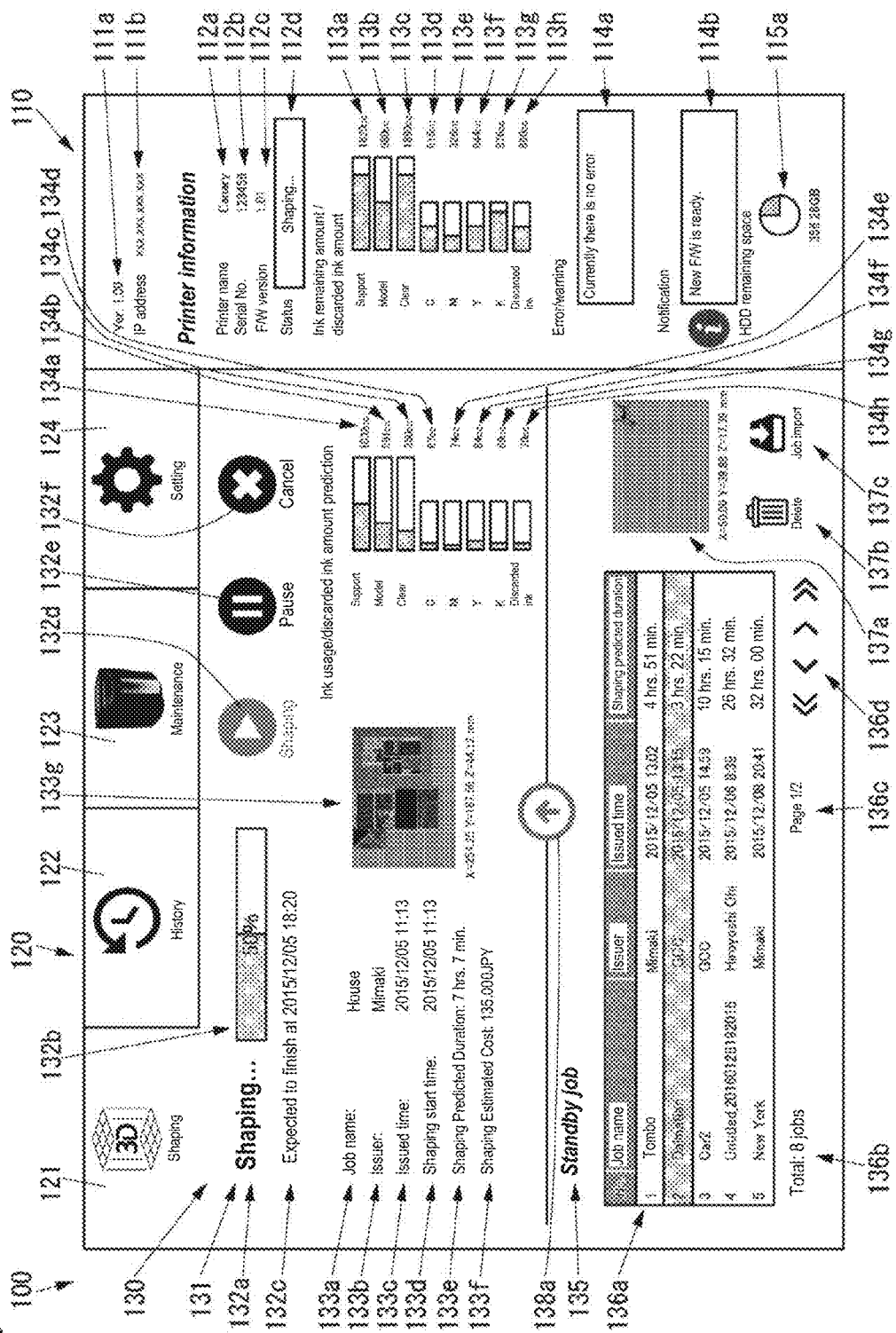
FIG. 6 is a diagram showing an example of a graphical user interface displayed on a display device shown in FIG. 4.

FIG. 6 is a diagram showing an example of a graphical user interface (hereafter termed "GUI") 100 displayed on the display device 42.

When the printer controller 40 is activated, the controlling section 45 executes the printer control program 44a to display a GUI 100 shown in FIG. 6 on the display device 42.

As shown in FIG. 6, the GUI 100 includes a constant display area 110 where information of the 3D printer 20 and the printer controller 40 is constantly displayed, and a display switchable area 120 of which display contents are switched by a tab.

The constant display area 110 includes an application version display area 111a for indicating a version of the printer control program 44a, and an IP address display area 111b for indicating an IP (Internet Protocol) address of the printer controller 40.

The constant display area 110 includes a printer name display area 112a for indicating a name of the 3D printer 20, a serial number display area 112b for indicating a serial number of the 3D printer 20, an FW version display area 112c for indicating a version of a firm ware of the 3D printer 20, and a status display area 112d for indicating a status of the 3D printer 20, being one of "shaping", "standby", and "shaping not available".

The constant display area 110 includes a support ink remaining amount display area 113a for indicating a stored amount of the support ink in the ink tank 26 for the support ink, that is, a remaining amount thereof in a graph and in a numerical value. Similarly for the modeling ink, the clear ink, the cyan ink, the magenta ink, the yellow ink, and the black ink, the constant display area 110 includes a modeling ink remaining amount display area 113b, a clear ink remaining amount display area 113c, a cyan ink remaining amount display area 113d, a magenta ink remaining amount display area 113e, a yellow ink remaining amount display area 113f, and a black ink remaining amount display area 113g. Further, the constant display area 110 includes a discarded ink amount display area 113h for indicating a stored amount of the UV ink 21a in the discarded ink tank 27.

The graph of the support ink remaining amount display area 113a shows a total storable amount of the support ink in the ink tank 26 for the support ink by an overall rectangle, and the stored amount of the support ink in the ink tank 26 for the support ink is indicated by a rectangle on the left side as included in the overall rectangle. The same applies to the modeling ink remaining amount display area 113b, the clear ink remaining amount display area 113c, the cyan ink remaining amount display area 113d, the magenta ink remaining amount display area 113e, the yellow ink remaining amount display area 113f, the black ink remaining amount display area 113g, and the discarded ink amount display area 113h.

In the support ink remaining amount display area 113a, when the remaining amount of the support ink in the ink tank 26 for the support ink becomes below a certain amount, some sort of emphasized display is displayed, such as a letter string of "support" indicating the support ink, being the UV ink 21a, that is a target of the support ink remaining amount display area 113a, is displayed with emphasis. The same applies to the modeling ink remaining amount display area 113b, the clear ink remaining amount display area 113c, the cyan ink remaining amount display area 113d, the magenta ink remaining amount display area 113e, the yellow ink remaining amount display area 113f, and the black ink remaining amount display area 113g. Further, in the discarded ink amount display area 113h, some sort of emphasized display is displayed, such as a letter string of "discarded ink" being displayed with emphasis, when the stored amount of the UV ink 21a in the discarded ink tank 27 exceeds a certain amount.

The constant display area 110 includes an error/warning display area 114a for indicating an error or a warning that has been occurring during a recent period, and a notification display area 114b for notifying version update information and the like for updating versions of the firmware of the printer control program 44a and the 3D printer 20. The notification display area 114b displays an icon when there is version update information. Further, when this icon is clicked, the controlling section 45 displays a version update screen on the display device 42 for updating the version of the firmware of the printer control program 44a or the 3D printer 20.

The constant display area 110 includes an HDD remaining space display area 115a for displaying a remaining space in a work folder of the storing section 44 in a graph. In the HDD remaining space display area 115a, some sort of emphasized display is displayed, such as a color of the graph changes, when the remaining space of the work folder of the storing section 44 becomes below a certain size.

The display switchable area 120 includes a shaping tab 121 for switching displayed contents of the display switchable area 120 to the job display area 130 for displaying a print job being a current processing target by the 3D printer 20 (hereafter termed "current target job") and a print job that is on standby for the processing by the 3D printer 20 (hereafter termed "standby job"), a history tab 122 for switching the displayed contents of the display switchable area 120 to a history display area 140 (described later, see FIG. 7) for displaying shaping results 44c as a history, a maintenance tab 123 for switching the displayed contents of the display switchable area 120 to a maintenance-related information display area for displaying information related to the maintenance of the 3D printer 20, and a setting tab 124 for switching the displayed contents of the display switchable area 120 to a display setting area for various types of settings, such as a display language setting for the GUI 100, a network setting for the printer controller 40, and the like.

It should be noted that the detailed description regarding a maintenance-related information display area and a setting display area will be omitted.

The job display area 130 includes a current target job display area 131 for indicating the current target job and a standby job display area 135 for indicating the standby job.

The current target job display area 131 includes a status display area 132a for indicating one of statuses "shaping", "standby", and "paused" as a status of the current target job, a progress display area 132b for indicating a degree of progress (%) of the shaping of the current target job by a progress bar, and a completion scheduled time display area 132c for indicating a completion scheduled time of the current target job. The controlling section 45 executing the printer control program 44a can calculate the time predicted as necessary for the shaping of the current target job (hereafter termed "shaping predicted duration") based on the 3D model data of the current target job. Further, the controlling section 45 executing the printer control program 44a can calculate the completion scheduled time of the current target job by adding the shaping predicted duration of the current target job to a start time of the shaping of the current target job.

The current target job display area 131 includes a shaping start button 132d for starting the shaping of the current target job, a pause button 132e for temporarily stopping the shaping of the current target job, and a cancel button 132f for canceling the shaping of the current target job. When the shaping start button 132d is operated, the shaping data generated based on the 3D model data of the current target job is sent to the 3D printer 20. The shaping start button 132d cannot be operated by being grayed out when there is no current target job, or when the status of the current target job is "shaping". The pause button 132e cannot be operated by being grayed out except during when the status of the current target job is "shaping". The cancel button 132f cannot be operated by being grayed out except during when the status of the current target job is "paused". When the cancel button 132f is operated, the current target job no longer becomes a current target job, and is included in the history (that is, it is included in a history job list display area 141a (see FIG. 7)).

The current target job display area 131 includes a job name display area 133a for indicating a name of the current target job, an issuer display area 133b for indicating an issuer of the current target job, an issued time display area 133c for indicating an issued time of the current target job, a shaping start time display area 133d for indicating the start time of the shaping of the current target job, a shaping predicted duration display area 133e for indicating the shaping predicted duration of the current target job, and a shaping predicted cost display area 133f for indicating cost required for the shaping of the current target job. Here, the controlling section 45 executing the printer control program 44a can calculate the cost required for the shaping of the current target job based on the shaping predicted duration of the current target job, the usage of the UV ink 21a predicted for the shaping of the current target job, for example.

The current target job display area 131 includes a preview display area 133g for indicating a preview of the shaping of the current target job.

The preview indicated by a preview display area 133g is a preview for a case of observing the three-dimensional object to be shaped by the 3D printer 20 from a top side along the vertical direction 20a. Numerical values indicated below the preview indicated in the preview display area 133g indicate a size of the three-dimensional object to be shaped by the 3D printer 20. Here, X, Y, and Z respectively indicate the sub scanning direction, the main scanning direction 20b, and the vertical direction 20a.

The current target job display area 131 includes a support ink predicted usage display area 134a for indicating a usage of the support ink as predicted for the printing by the 3D printer 20 based on particular 3D model data in a graph and in numerical values. Similarly for the modeling ink, the clear ink, the cyan ink, the magenta ink, the yellow ink, and the black ink, the current target job display area 131 includes a modeling ink predicted usage display area 134b, a clear ink predicted usage display area 134c, a cyan ink predicted usage display area 134d, a magenta ink predicted usage display area 134e, a yellow ink predicted usage display area 134f, and a black ink predicted usage display area 134g. Further, the current target job display area 131 includes a discarded ink amount prediction display area 134h for indicating a discarded amount of the UV ink 21a to the discarded ink tank 27 as predicted for the printing by the 3D printer 20 based on the particular 3D model data.

The graph in the support ink predicted usage display area 134a indicates the total storable amount of the support ink in the ink tank 26 for the support ink by an overall rectangle, and the usage of the support ink from the ink tank 26 for the support ink as predicted for the printing by the 3D printer 20 based on the particular 3D model data is indicated by a rectangle on the left side as included in the overall rectangle. The same applies to the modeling ink predicted usage display area 134b, the clear ink predicted usage display area 134c, the cyan ink predicted usage display area 134d, the magenta ink predicted usage display area 134e, the yellow ink predicted usage display area 134f, and the black ink predicted usage display area 134g. The graph in the discarded ink amount prediction display area 134h indicates the total storable amount of the UV ink 21a in the discarded ink tank 27 by an overall rectangle, and the discarded amount of the UV ink 21a to the discarded ink tank 27 as predicted for the printing by the 3D printer 20 based on the particular 3D model data is indicated by a rectangle on the left side as included in the overall rectangle.

The standby job display area 135 includes a standby job list display area 136a for indicating standby jobs in a list. When a number of the standby jobs exceeds a maximum number displayable in a one-page worth list, the standby job list display area 136a is capable of displaying all of the standby jobs by its page being switched. In the standby job list display area 136a, a standby job can be selected by a row of the displayed standby job being clicked. In the standby job list display area 136a, a plurality of standby jobs cannot be selected simultaneously. Each of the standby jobs displayed in the standby job list display area 136a is associated with 3D model data and shaping data of that standby job, which are included in the 3D model data and the shaping data stored in the storing section 44.

The standby job display area 135 includes a total number display area 136b for indicating a total number of the standby jobs, a page number display area 136c for indicating a page number of the list displayed in the standby job list display area 136a, and a page changing button 136d for switching the page of the list displayed on the standby job list display area 136a. The page changing button 136d cannot be operated by being grayed out when the number of the standby jobs is equal to or less than the maximum number displayable in the one-page worth list.

The standby job display area 135 includes a preview display area 137a, which is similar to the preview display area 133g, for indicating a preview of the shaping of the standby job selected in the standby job list display area 136a, a delete button 137b for deleting the standby job selected in the standby job list display area 136a from the standby job list display area 136a, and a job import button 137c for adding a print job stored in an external storage medium such as a USB memory to the standby job list display area 136a as a standby job.

The standby job display area 135 includes a shifting button 138a for shifting the standby job selected in the standby job list display area 136a to a current target job. The standby job that had shifted to the current target job by the shifting button 138a being operated is deleted from the standby job list display area 136a.

Figure 7:
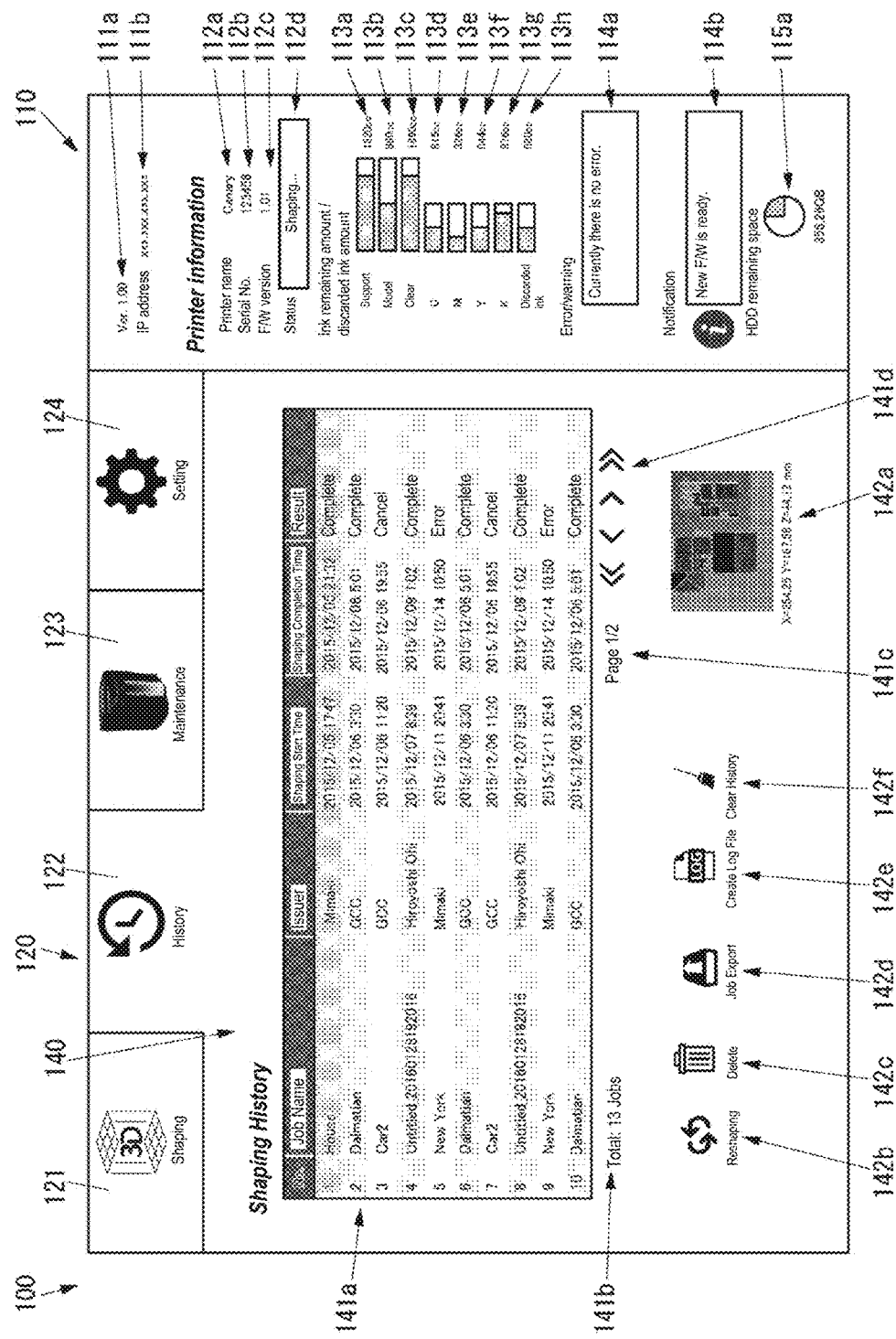
FIG. 7 is a diagram showing an example of the graphical user interface shown in FIG. 6, for a case where a history displaying area is being displayed.

FIG. 7 is a diagram showing an example of the GUI 100 for a case where the history display area 140 is being displayed.

As shown in FIG. 7, the history display area 140 includes a history job list display area 141a for indicating print jobs included in the history (hereafter termed "history jobs") in a list. When a tile row, that is, one of titles in preceding lines is clicked, the history job list display area 141a is sorted by the clicked title. Each time the same title is clicked in succession, the history job list display area 141a switches its sorting order between ascending and descending orders. The history job list display area 141a is sorted in the ascending order by titles of "No." by default. When a number of the history jobs exceeds a maximum number displayable in a one-page worth list, the history job list display area 141a is capable of displaying all of the history jobs by its page being switched. In the history job list display area 141a, a history job can be selected by a row of the displayed history job being clicked. In the history job list display area 141a, a plurality of history jobs cannot be selected simultaneously.

Each of the history jobs displayed in the history job list display area 141a is associated with 3D model data and shaping data of that history job, which are included in the 3D model data and the shaping data stored in the storing section 44.

It should be noted that, in the history job list display area 141a, a history job having "complete" as a value in a "result" column is a history job of which print job execution by the 3D printer 20 has been completed. Further, in the history job list display area 141a, a history job having "cancel" as the value in the "result" column is a history job of which print job execution by the 3D printer 20 has been stopped before completion, and an interrupted time point in the print job is associated thereto.

The history display area 140 includes a total number display area 141b for indicating a total number of the history jobs, a page number display area 141c for indicating a page number of the list displayed in the history job list display area 141a, and a page changing button 141d for switching the page of the list displayed on the history job list display area 141a. The page changing button 141d cannot be operated by being grayed out when the number of the history jobs is equal to or less than the maximum number displayable in the one-page worth list.

The history display area 140 includes a preview display area 142a, similar to the preview display area 133g (see FIG. 6) for indicating the preview of the shaping of the history job selected in the history job list display area 141a.

The history display area 140 includes a reshaping button 142b for setting the history job selected in the history job list display area 141a as a standby job (that is, including this job to the standby job list display area 136a), a delete button 142c for deleting the history job selected in the history job list display area 141a from the history job list display area 141a, that is, from the history, a job export button 142d for storing the history job selected in the history job list display area 141a in an external storing medium such as a USB memory, a log file creating button 142e for writing history information in a text file, and a history clear button 142f for deleting all of the print jobs included in the history from the history.

It should be noted that, even if the reshaping button 142b is pressed, the history job selected in the history job list display area 141a is not deleted from the history job list display area 141a.

Further, even if the log file creating button 142e is pressed, the 3D model data and the shaping data of the print jobs included in the history are not written.

Next, an operation of the printer controller 40 for a case of displaying a predicted value for a print-related value will be described.

Figure 8:
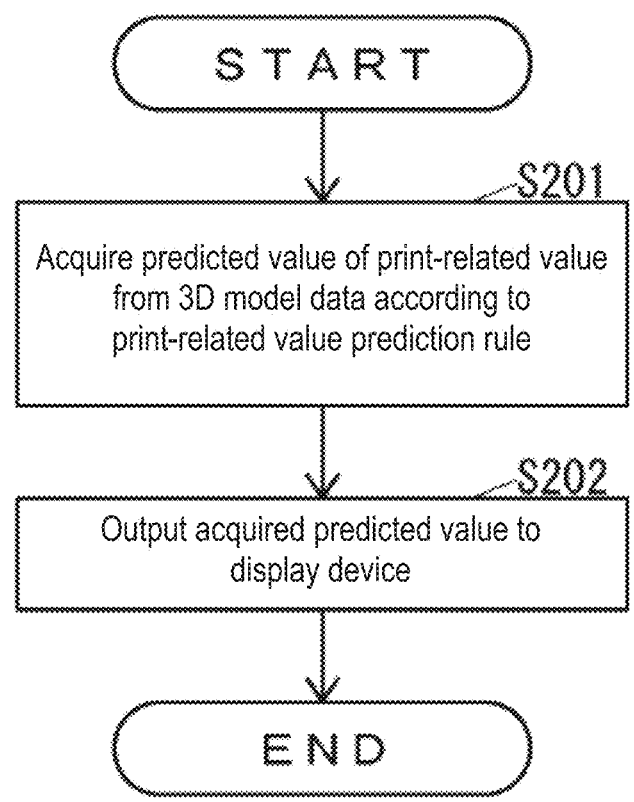
FIG. 8 is an operational flow chart of the printer controller shown in FIG. 4, for a case of displaying a predicted value for a print-related value.

When the standby job is shifted to being the current target job by the shifting button 138a being operated, the printer controller 40 performs an operation shown in FIG. 8.

FIG. 8 is an operational flow chart of the printer controller 40 for the case of displaying the predicted value for the print-related value.

As shown in FIG. 8, the predicted value acquiring section 45a acquires the predicted value of the print-related value of the 3D printer 20 from the 3D model data according to the print-related value prediction rule 44b (S201).

Then, the predicted value outputting section 45b outputs the predicted value acquired in S201 to the display device 42 (S202). For example, the predicted value outputting section 45b displays the predicted value for the time required for the printing by the 3D printer 20 as acquired in S201, that is, a shaping predicted duration in the shaping predicted duration display area 133e. Further, the predicted value outputting section 45b displays the predicted value for the amount of the UV ink 21a required for the printing by the 3D printer 20 as acquired in S201 in the support ink predicted usage display area 134a, the modeling ink predicted usage display area 134b, the clear ink predicted usage display area 134c, the cyan ink predicted usage display area 134d, the magenta ink predicted usage display area 134e, the yellow ink predicted usage display area 134f, and the black ink predicted usage display area 134g for each of the types of the UV ink 21a. Further, the predicted value outputting section 45b displays the amount of the discarded ink required for the printing by the 3D printer 20 as acquired in S201 in the discarded ink amount prediction display area 134h. Further, the predicted value outputting section 45b displays the cost required for the printing by the 3D printer 20 as acquired in S201 in the shaping predicted cost display area 133f.

The predicted value outputting section 45b ends the operation shown in FIG. 8 after the process of S202.

Here, the print-related value prediction rules 44b will be described specifically. As an example, the print-related value prediction rule 44b for the amounts of the UV ink 21a required for the printing by the 3D printer 20 will be described.

Figure 9:
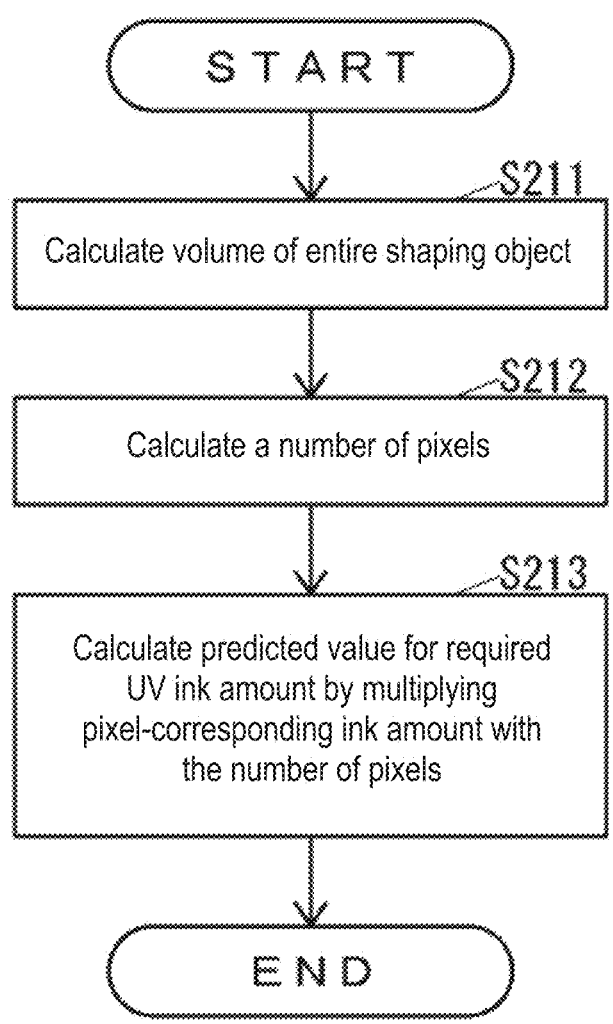
FIG. 9 is a flow chart showing an example of a print-related value prediction rule shown in FIG. 4 regarding a UV ink amount required for printing by the 3D printer.

FIG. 9 is a flow chart showing an example of the print-related value prediction rule 44b regarding the amount of the UV ink 21a required for the printing by the 3D printer 20. It should be noted that, for the sake of easier understanding, an amount of the UV ink 21a as a whole will be considered for a case of shaping based on specific 3D model data, without giving consideration to the types of the UV ink 21a.

As shown in FIG. 9, the predicted value acquiring section 45a calculates a volume for an entirety including the three-dimensional object and its supporting portion (hereafter termed "entire shaping object") based on the 3D model data (S211).

Then, the predicted value acquiring section 45a divides the volume calculated in S211 by a volume for one pixel to calculate a number of pixels configuring the entire shaping object (S212).

Next, the predicted value acquiring section 45a calculates the predicted value for the UV ink 21a required for the printing by the 3D printer 20 by multiplying the amount of the UV ink 21a set as corresponding to the volume of one pixel (hereafter termed "pixel-corresponding ink amount") with the number of the pixels calculated in S212 (S213), and completes the operation shown in FIG. 9.

Next, an operation of the printer controller 40 for a case of shaping a three-dimensional object by the 3D printer 20 will be described.

Figure 10:
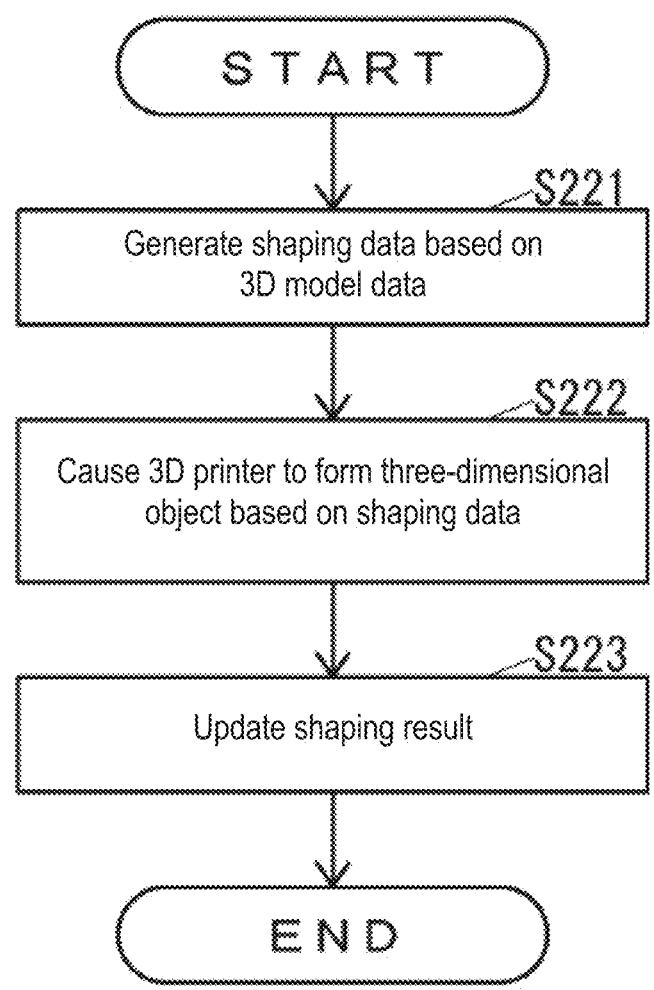
FIG. 10 is an operational flow chart of the printer controller shown in FIG. 4, for a case of shaping a three-dimensional object by the 3D printer.

When the shaping start button 132d is pressed, the controlling section 45 of the printer controller 40 executes the printer control program 44a to perform an operation shown in FIG. 10.

FIG. 10 is an operational flow chart of the printer controller 40 for the case of shaping the three-dimensional object by the 3D printer 20.

As shown in FIG. 10, the controlling section 45 generates shaping data based on the 3D model data of the current target job (S221).

Then, the controlling section 45 causes the 3D printer 20 to form a three-dimensional object based on the shaping data generated in S221 (S222).

Next, the controlling section 45 updates the shaping result 44c to include the result of the shaping in S222 (S223), and completes the operation shown in FIG. 10.

It should be noted that the printer controller 40 can omit the process of S221 when an identical print job is to be repeatedly performed, by associating the shaping data that had once been generated to the print job and storing them in the storing section 44 or the like.

Next, an operation of the printer controller 40 for a case of correcting the print-related value prediction rule 44b will be described.

Figure 11:
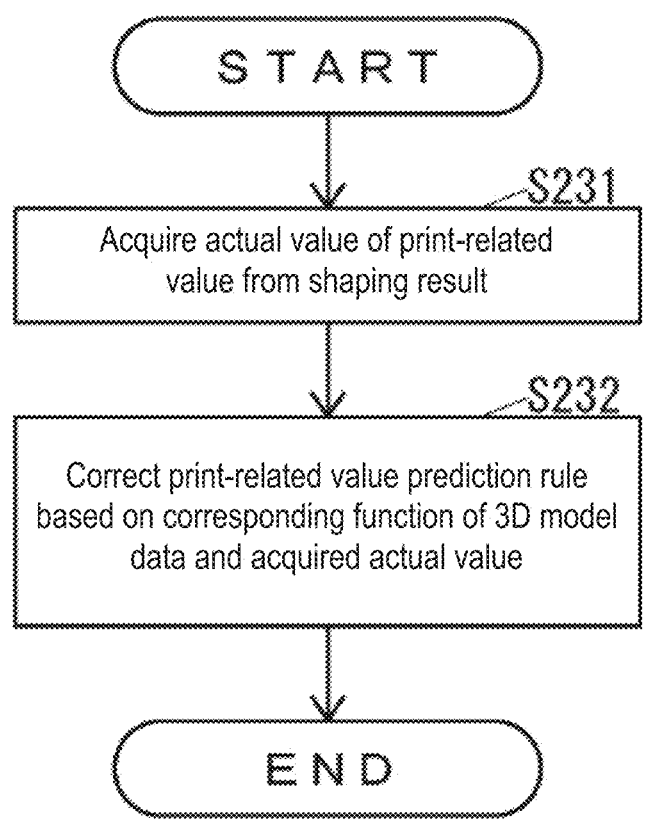
FIG. 11 is an operational flow chart of the printer controller shown in FIG. 4, for a case of correcting a prediction rule for the print-related value.

The printer controller 40 executes the operation shown in FIG. 11 each time a three-dimensional object is shaped by the 3D printer 20.

FIG. 11 is an operational flow chart of the printer controller 40, for the case of correcting the print-related value prediction rule 44b.

As shown in FIG. 11, the actual value acquiring section 45c acquires the actual value of the print-related value in the printing by the 3D printer 20 based on the 3D model data from the shaping result 44c (S231).

Then, the rule correcting section 45d corrects the print-related value prediction rule 44b based on a corresponding relationship of the 3D model data and the actual value acquired in S231 for this 3D model data (hereafter termed "data-to-actual value corresponding relationship") (S232), and completes the operation shown in FIG. 11.

Here, the correction of the print-related value prediction rule 44b will be described.

For example, in a case where the print-related value prediction rule 44b for the amount of the UV ink 21a required for the printing by the 3D printer 20 is a rule as shown in FIG. 9, the rule correcting section 45d corrects the aforementioned pixel-corresponding ink amount in S232.

Further, in regard to the print-related value prediction rule 44b regarding the time required for the printing by the 3D printer 20, for example, values such as a speed of a relative movement of the carriage 24 in the main scanning direction 20b with respect to the stage 25, a speed of a relative movement of the carriage 24 in the sub scanning direction with respect to the stage 25, and a speed of a relative movement of the stage 25 in the vertical direction 20a with respect to the carriage 24 are relevant, and the rule correcting section 45d corrects these values in S232. At this occasion, the rule correcting section 45d may correct the print-related value prediction rule 44b based on a plurality of data-to-actual value corresponding relationship that respectively correspond to a plural sets of printing ranges (for example, corresponding to respective layers 21b) in one print job by the 3D printer 20 based on the 3D model data.

As described above, the printer controller 40 can improve the accuracy of the predicted values of the print-related values by correcting the print-related value prediction rules 44b based on the data-to-actual value corresponding relationships (S232). For example, since the printer controller 40 can improve the accuracy of the predicted value for the time required for the printing by the 3D printer 20, the predicted value for the amount of the UV ink 21a required for the printing by the 3D printer 20, the predicted value for the amount of the discarded ink required for the printing by the 3D printer 20, and the predicted value for the cost required for the printing by the 3D printer 20, convenience can thereby be improved.

Especially, the printer controller 40 can significantly improve the accuracy of the predicted values of the print-related values for 3D model data similar to the 3D model data used in the correction of the print-related value prediction rules 44b.

The printer controller 40 corrects the print-related value prediction rules 44b based on the plurality of data-to-actual value corresponding relationships acquired in one print job by the 3D printer 20 based on the 3D model data, and as such, the accuracy of the predicted values of the print-related values can further be improved.

In the above, the display of the predicted values of the print-related values in the display device 42 as instructed by the printer controller 40 and the correction of the print-related value prediction rules 44b by the printer controller 40 are described. However, the three-dimensional shaping system 10 may display the predicted values of the print-related values in the display device 52 by instructions from the 3D model data generation device 50, similar to the printer controller 40, and the print-related value prediction rules 54b may be corrected. In this case, the 3D model data generation device 50 can acquire the shaping result 44c from the printer controller 40.

The three-dimensional shaping system 10 in this embodiment causes the GUI 100 to be displayed on the display device 42 of the printer controller 40. However, the three-dimensional shaping system 10 may cause a GUI similar to the GUI 100 to be displayed in the display device 32 of the 3D printer 20 or in the display device 52 of the 3D model data generation device 50. The GUI displayed in the display device 32 of the 3D printer 20 is operated for example by the operating unit 31. Further, the GUI displayed in the display device 52 of the 3D model data generation device 50 is operated for example by the operating unit 51.

In the above, the print-related value prediction rules 44b are rules for acquiring the predicted values of the print-related values from the 3D model data. However, the printer controller 40 can generate shaping data from the 3D model data. Thus, the print-related value prediction rules 44b may be rules for acquiring predicted values of print-related values from the shaping data.

The three-dimensional shaping system 10 in this embodiment is provided with the 3D printer 20 and the printer controller 40. However, the three-dimensional shaping system 10 may not be provided with the printer controller 40 if the 3D printer 20 is provided with functions of the printer controller 40 as aforementioned.

In this embodiment, a three-dimensional shaping system, that is, a three-dimensional printing system has been described. However, the present disclosure may be applied to a two-dimensional printing system as well.

What is claimed is:

1. A non-transitory computer readable medium stored with a predicted value output program comprising instructions for causing a computer to realize:

a predicted value acquiring section configured to acquire a predicted value for a print-related value, which is a value related to printing by an ink jet printer, from data used in the printing by the ink jet printer according to a specific rule;

a predicted value outputting section configured to output the predicted value acquired by the predicted value acquiring section;

an actual value acquiring section configured to acquire an actual value of the print-related value in the printing by the ink jet printer based on the data; and a rule correcting section configured to correct the specific rule, wherein the rule correcting section corrects the specific rule based on a corresponding relationship of the data and the actual value acquired by the actual value acquiring section for the data.

2. The non-transitory computer readable medium according to claim 1, wherein the rule correcting section corrects the specific rule based on a plurality of the corresponding relationships, which respectively correspond to plural sets of printing ranges in one print job performed by the ink jet printer based on the data.

3. The non-transitory computer readable medium according to claim 1, wherein the print-related value is an ink amount required for the printing by the ink jet printer.

4. The non-transitory computer readable medium according to claim 1, wherein the print-related value is a time required for the printing by the ink jet printer.

5. The non-transitory computer readable medium according to claim 1, wherein the print-related value is cost required for the printing by the ink jet printer.

6. A predicted value output device comprising:
a predicted value acquiring section configured to acquire a predicted value for a print-related value, which is a value related to printing by an ink jet printer, from data used in the printing by the ink jet printer according to a specific rule;
a predicted value outputting section configured to output the predicted value acquired by the predicted value acquiring section;
an actual value acquiring section configured to acquire an actual value of the print-related value in the printing by the ink jet printer based on the data; and
a rule correcting section configured to correct the specific rule,
wherein the rule correcting section corrects the specific rule based on a corresponding relationship of the data and the actual value acquired by the actual value acquiring section for the data.

7. A predicted value output method comprising:
a predicted value acquiring step of acquiring a predicted value for a print-related value, which is a value related to printing by an ink jet printer, from data used in the printing by the ink jet printer according to a specific rule;
a predicted value outputting step of outputting the predicted value acquired in the predicted value acquiring step;
an actual value acquiring step of acquiring an actual value of the print-related value in the printing by the ink jet printer based on the data; and
a rule correcting step of correcting the specific rule,
wherein the rule correcting step corrects the specific rule based on a corresponding relationship of the data and the actual value acquired in the actual value acquiring step for the data.

8. The non-transitory computer readable medium according to claim 2, wherein the print-related value is an ink amount required for the printing by the ink jet printer.

9. The non-transitory computer readable medium according to claim 2, wherein the print-related value is a time required for the printing by the ink jet printer.

10. The non-transitory computer readable medium according to claim 2, wherein the print-related value is cost required for the printing by the ink jet printer.

* * * * *